(12) United States Patent
Yeh et al.

(10) Patent No.: US 11,780,129 B2
(45) Date of Patent: Oct. 10, 2023

(54) MOLDING METHOD FOR OPERATING MOLDING DEVICE

(71) Applicant: KING STEEL MACHINERY CO., LTD., Taichung (TW)

(72) Inventors: Liang-Hui Yeh, Taichung (TW); Ching-Hao Chen, Taichung (TW); Yi-Chung Lee, Taichung (TW)

(73) Assignee: KING STEEL MACHINERY CO., LTD., Taichung (TW)

( * ) Notice: Subject to any disclaimer, the term of this patent is extended or adjusted under 35 U.S.C. 154(b) by 0 days.

(21) Appl. No.: 16/931,313

(22) Filed: Jul. 16, 2020

(65) Prior Publication Data
US 2021/0291418 A1   Sep. 23, 2021

Related U.S. Application Data

(60) Provisional application No. 62/992,764, filed on Mar. 20, 2020.

(51) Int. Cl.
*B29C 45/34* (2006.01)
*B29C 45/04* (2006.01)
*B29C 45/17* (2006.01)

(52) U.S. Cl.
CPC ...... *B29C 45/0416* (2013.01); *B29C 45/1711* (2013.01); *B29C 45/34* (2013.01)

(58) Field of Classification Search
CPC ... B29C 45/0416; B29C 45/34; B29C 45/174; B29C 45/56
See application file for complete search history.

(56) References Cited

U.S. PATENT DOCUMENTS

| | | | |
|---|---|---|---|
| 3,674,401 A | 7/1972 | Annis, Jr. et al. |
| 3,787,278 A | 1/1974 | Ready et al. |
| 3,793,415 A | 2/1974 | Smith |
| 4,133,858 A | 1/1979 | Hayakawa et al. |

(Continued)

FOREIGN PATENT DOCUMENTS

| CN | 1788974 A | 6/2006 |
|---|---|---|
| CN | 101068670 A | 11/2007 |

(Continued)

OTHER PUBLICATIONS

Extended Search Report dated Jul. 13, 2021 issued by the European Patent Office for the EP patent application No. 21152948.2-1017.

(Continued)

*Primary Examiner* — Alison L Hindenlang
*Assistant Examiner* — Debjani Roy
(74) *Attorney, Agent, or Firm* — WPAT LAW; Anthony King

(57) ABSTRACT

A molding method includes providing a molding device, wherein the molding device includes a first mold and a second mold corresponding to the first mold; moving the first mold towards the second mold to form a first mold cavity; supplying a gas to the first mold cavity; injecting a material into the first mold cavity; and moving the first mold away from the second mold to form a second mold cavity and discharge at least a portion of the gas out of the molding device, wherein a first volume of the first mold cavity is substantially less than a second volume of the second mold cavity.

18 Claims, 6 Drawing Sheets

(56) References Cited

U.S. PATENT DOCUMENTS

| | | | |
|---|---|---|---|
| 4,153,231 | A | 5/1979 | Hayakawa et al. |
| 4,923,653 | A | 5/1990 | Matsuura et al. |
| 5,547,621 | A | 8/1996 | Naritomi |
| 6,036,908 | A * | 3/2000 | Nishida ............... B29C 45/1671 |
| | | | 264/254 |
| 6,146,562 | A | 11/2000 | Hettinga |
| 6,358,446 | B1 | 3/2002 | Clarke |
| 6,398,996 | B1 | 6/2002 | Fang |
| 6,926,940 | B2 | 8/2005 | Ozaka et al. |
| 2002/0094428 | A1 | 7/2002 | Nomura et al. |
| 2003/0017224 | A1 | 1/2003 | Byma et al. |
| 2004/0094866 | A1 | 5/2004 | Boucherie |
| 2005/0181085 | A1 | 8/2005 | Harada et al. |
| 2005/0285294 | A1 | 12/2005 | Ozaka et al. |
| 2007/0205621 | A1 | 9/2007 | Cowelchuk et al. |
| 2009/0140447 | A1 * | 6/2009 | Kawamura ........... B29C 44/586 |
| | | | 264/51 |
| 2012/0196115 | A1 | 8/2012 | Choe et al. |
| 2013/0328229 | A1 | 12/2013 | Helming et al. |
| 2014/0162019 | A1 | 6/2014 | Kong et al. |
| 2014/0306366 | A1 * | 10/2014 | Egawa .................... B29C 44/42 |
| | | | 264/41 |
| 2016/0039162 | A1 | 2/2016 | Murphy et al. |
| 2017/0239856 | A1 | 8/2017 | Skinner et al. |
| 2020/0180200 | A1 | 6/2020 | Chen et al. |

FOREIGN PATENT DOCUMENTS

| | | |
|---|---|---|
| CN | 104786420 A | 7/2015 |
| CN | 106808675 A | 6/2017 |
| CN | 107107412 A | 8/2017 |
| CN | 107825639 A | 3/2018 |
| CN | 207190085 U | 4/2018 |
| CN | 109968578 A | 7/2019 |
| DE | 202009002230 U1 | 5/2010 |
| EP | 1849575 A1 | 10/2007 |
| EP | 2402138 A1 | 1/2012 |
| FR | 2167344 A1 | 8/1973 |
| GB | 1229790 A | 4/1971 |
| JP | S59-199227 A | 11/1984 |
| JP | S59199227 A | 11/1984 |
| JP | H01-200917 A | 8/1989 |
| JP | H01-259801 A | 10/1989 |
| JP | H04-122302 A | 4/1992 |
| JP | H06198668 A | 7/1994 |
| JP | H06-246783 A | 9/1994 |
| JP | H0890620 A | 4/1996 |
| JP | 2585358 B2 | 2/1997 |
| JP | H11309739 A | 11/1999 |
| JP | 2000334763 A | 12/2000 |
| JP | 2001501884 A | 2/2001 |
| JP | 2004-009650 A | 1/2004 |
| JP | 2004009650 A | 1/2004 |
| JP | 3519468 B | 2/2004 |
| JP | 2006095867 A | 4/2006 |
| JP | 2006159898 A | 6/2006 |
| JP | 2008157383 A | 7/2008 |
| JP | 2009172780 * | 8/2009 |
| JP | 2009172780 A | 8/2009 |
| JP | 2010125733 A | 6/2010 |
| JP | 2011025450 A | 2/2011 |
| JP | 2011025472 A | 2/2011 |
| JP | 2013132831 A | 7/2013 |
| JP | 2021169853 A | 10/2021 |
| KR | 20-0467575 Y1 | 6/2013 |
| TW | 202000427 A | 1/2020 |
| TW | 202132082 A | 9/2021 |
| WO | 0115882 A1 | 3/2001 |
| WO | 2014175331 A1 | 10/2014 |
| WO | 2016023067 A1 | 2/2016 |

OTHER PUBLICATIONS

Office action, Cited References and Search report dated Oct. 6, 2021 issued by the Taiwan Intellectual Property Office (TIPO) for the Taiwanese counterpart application No. 110102556.

Office action, Cited References and Search report dated Nov. 29, 2021 issued by the Korean Intellectual Property Office (KIPO) for the Korean counterpart application No. 10-2021-0017025.

Office action, Cited reference (JP2585358B2) and Search report dated Feb. 3, 2022 issued by the Korean Intellectual Property Office (KIPO) for the Korean application No. 10-2021-0031445.

Office Action and Cited Reference (JP2004-009650A) dated Feb. 8, 2022 issued by the Japan Intellectual Property Office for the corresponding Japanese patent application No. 2021-010201.

Office Action and Cited References dated Mar. 1, 2022 issued by the Japan Intellectual Property Office for the corresponding Japanese patent application No. 2021-019688.

Notice of Last Preliminary Rejection dated Aug. 22, 2022 issued by the Korean Intellectual Property Office (KIPO) for the Korean application No. 10-2021-0031445.

Office action issued by the European Patent Office of EP patent application No. 21152948.2-1017 dated Oct. 5, 2022.

Office Action and Search Report dated Oct. 8, 2022 issued by China Intellectual Property Office for CN application No. 202110255786. 1.

Office Action and Search Report dated Oct. 27, 2022 issued by China Intellectual Property Office for CN application No. 202110085162.X.

Non-Final Rejection and List of References of U.S. Appl. No. 17/147,417 dated Jul. 24, 2022.

Extended Search Report from the European Patent Office of EP patent application No. 21161501.8-1017 dated Jul. 21, 2021.

Office action, Cited References and Search report dated Jan. 16, 2023 issued by the Taiwan Intellectual Property Office (TIPO) for the Taiwanese counterpart application No. 110102556.

Office action, Cited References and Search report dated Mar. 14, 2023 issued by the Japan Patent Office (JPO) for the Japanese counterpart application No. 2021-010201.

Office Action and Search Report dated Dec. 18, 2019 issued by China National Intellectual Property Administration (CNIPA) for CN application No. 201710371785.7.

Office Action and Search Report dated Jul. 22, 2020 issued by China National Intellectual Property Administration (CNIPA) for CN application No. 201710371785.7.

Office Action and Search Report dated Jan. 21, 2021 issued by China National Intellectual Property Administration (CNIPA) for CN application No. 201710371785.7.

Search Report and Communication dated Jan. 25, 2018 issued by European Patent Office (EPO) for EP application No. 171813116.

Search Report and Communication dated Mar. 9, 2021 issued by European Patent Office (EPO) for EP application No. 171813116.

Office Action dated Jun. 19, 2018 issued by Japan Patent Office (JPO) for JP application No. 2017-144582.

Office Action dated Oct. 22, 2018 issued by the Korean Intellectual Property Office (KIPO) for the Korean application No. 10-2017-0093538.

Office Action dated Apr. 30, 2019 issued by the Korean Intellectual Property Office (KIPO) for the Korean application No. 10-2017-0093538.

Office Action dated Jun. 28, 2019 issued by the Korean Intellectual Property Office (KIPO) for the Korean application No. 10-2017-0093538.

Office Action and Search Report dated Aug. 30, 2017 issued by Taiwan Patent Office (TIPO) for TW application No. 106116975.

Office Action and Search Report dated Sep. 25, 2019 issued by Taiwan Patent Office (TIPO) for TW application No. 106116975.

Final Office Action dated Dec. 26, 2019 issued by USPTO for U.S. Appl. No. 15/647,150.

Final Office Action dated Oct. 19, 2020 issued by USPTO for U.S. Appl. No. 15/647,150.

Final Office Action dated May 19, 2021 issued by USPTO for U.S. Appl. No. 15/647,150.

Office Action dated Jun. 28, 2019 issued by USPTO for U.S. Appl. No. 15/647,150.

(56) References Cited

OTHER PUBLICATIONS

Office Action dated Apr. 3, 2020 issued by USPTO for U.S. Appl. No. 15/647,150.
Office Action dated Feb. 3, 2021 issued by USPTO for U.S. Appl. No. 15/647,150.
Office Action and Search Report dated Jan. 21, 2021 issued by China National Intellectual Property Administration (CNIPA) for CN application No. 201810316097.5.
Office Action and Search Report dated Aug. 18, 2021 issued by China National Intellectual Property Administration (CNIPA) for CN application No. 201810316097.5.
Office Action and Search Report dated Nov. 7, 2018 issued by Taiwan Patent Office (TIPO) for TW application No. 107111828.
Office Action and Search Report dated Jul. 4, 2019 issued by Taiwan Patent Office (TIPO) for TW application No. 107111828.

* cited by examiner

MOLDING METHOD FOR OPERATING MOLDING DEVICE

CROSS-REFERENCE TO RELATED APPLICATION

This application claims priority of U.S. provisional application Ser. No. 62/992,764 filed on Mar. 20, 2020, which is incorporated by reference in its entirety.

TECHNICAL FIELD

The present invention is related to a molding device and a molding method for operating the molding device; in particular, to a molding device and a molding method thereof suitable for use in injection molding or extrusion molding.

BACKGROUND

Foamed polymer articles have many advantages, such as high strength, light weight, impact resistance, good sound insulation and thermal insulation, etc. The foamed polymer article can be made into a molded article having a predetermined shape by injection molding or extrusion molding. For example, after the polymer material is melted and mixed with a blowing agent through an injection molding machine to form a mixture, the molten polymer is applied by applying pressure so that it is injected or extruded into the mold cavity of the mold to form the desired foamed polymer article. The properties and applications of foamed polymer articles can be altered by changing the composition of the mixture and adjusting the forming method.

In general, the appearance and physical properties of the foamed polymer articles are directly affected by the forming process, and hence, the design of the mold must consider the fluidity of the mixture so that the mixture can be distributed in the cavity uniformly and rapidly and distribution density of bubble pores in the mixture is high and uniform during the forming process so as to retain the original physical property. Although foamed polymer articles formed using the mold has many advantages and applications, their shortcomings are still the limitations and restrictions that have yet to be broken.

BRIEF SUMMARY OF THE INVENTION

One purpose of the present invention is to provide a molding method for operating a molding device.

According to one embodiment of the present disclosure, a molding method is disclosed. The molding method includes providing a molding device, wherein the molding device includes a first mold and a second mold corresponding to the first mold; moving the first mold towards the second mold to form a first mold cavity; supplying a gas to the first mold cavity; injecting a material into the first mold cavity; and moving the first mold away from the second mold to form a second mold cavity and discharge at least a portion of the gas out of the molding device, wherein a first volume of the first mold cavity is substantially less than a second volume of the second mold cavity.

In some embodiments, at least the portion of the gas is discharged out of the molding device through a junction point disposed at the molding device.

In some embodiments, a gap between the first mold and the second mold is formed when the second mold cavity is formed, and the gap is communicable with the second mold cavity.

In some embodiments, at least the portion of the gas is discharged out of the molding device through the gap.

In some embodiments, at least the portion of the gas is discharged out of the molding device through the gap and a junction point disposed at the molding device.

In some embodiments, the junction point is entirely or partially covered by the material after the injection of the material into the first mold cavity.

In some embodiments, the first mold cavity and the second mold cavity are defined by a first inner sidewall of the first mold and a second inner sidewall of the second mold.

In some embodiments, the first mold cavity has a first pressure after the supply of the gas into the first mold cavity, the second mold cavity has a second pressure after the movement of the first mold away from the second mold, and the first pressure is substantially greater than the second pressure.

In some embodiments, the second pressure drops to a third pressure substantially equal to an atmosphere pressure when the second mold cavity is maintained at the second volume.

In some embodiments, the second mold cavity is maintained at the second volume for about 1 second to 5 seconds.

In some embodiments, the molding device is in a closed configuration when the first mold cavity is formed.

In some embodiments, the molding device is in a slight open configuration when the second mold cavity is formed.

In some embodiments, a conduit is connected to the junction point and is configured to supply the gas into the first mold cavity or discharge at least the portion of the gas out of the molding device.

In some embodiments, the material is injected into the first mold cavity through a passage communicable with the first mold cavity.

In some embodiments, the molding method further includes engaging an outlet of an injector with the passage after the formation of the first mold cavity; moving the injector away from the passage after the injection of the material into the first mold cavity and before the movement of the first mold away from the second mold.

According to one embodiment of the present disclosure, a molding method is disclosed. The molding method includes providing a molding device, wherein the molding device includes a first mold and a second mold disposed opposite to and complementary with the first mold; engaging the first mold with the second mold to form a mold cavity defined by a first inner sidewall of the first mold and a second inner sidewall of the second mold; injecting a gas into the mold cavity; injecting a material into the mold cavity; and enlarging the mold cavity to discharge at least a portion of the gas out of the mold cavity.

In some embodiments, a void surrounded by the material, the first mold and the second mold is formed during or after the enlargement of the mold cavity.

In some embodiments, the first mold is in contact with the second mold during or after the enlargement of the mold cavity.

In some embodiments, a gap between the first mold and the second mold and configured to discharge at least the portion of the gas out of the mold cavity is formed during or after the enlargement of the mold cavity.

In some embodiments, the molding method further includes separating the first mold from the second mold; removing the material out of the molding device.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
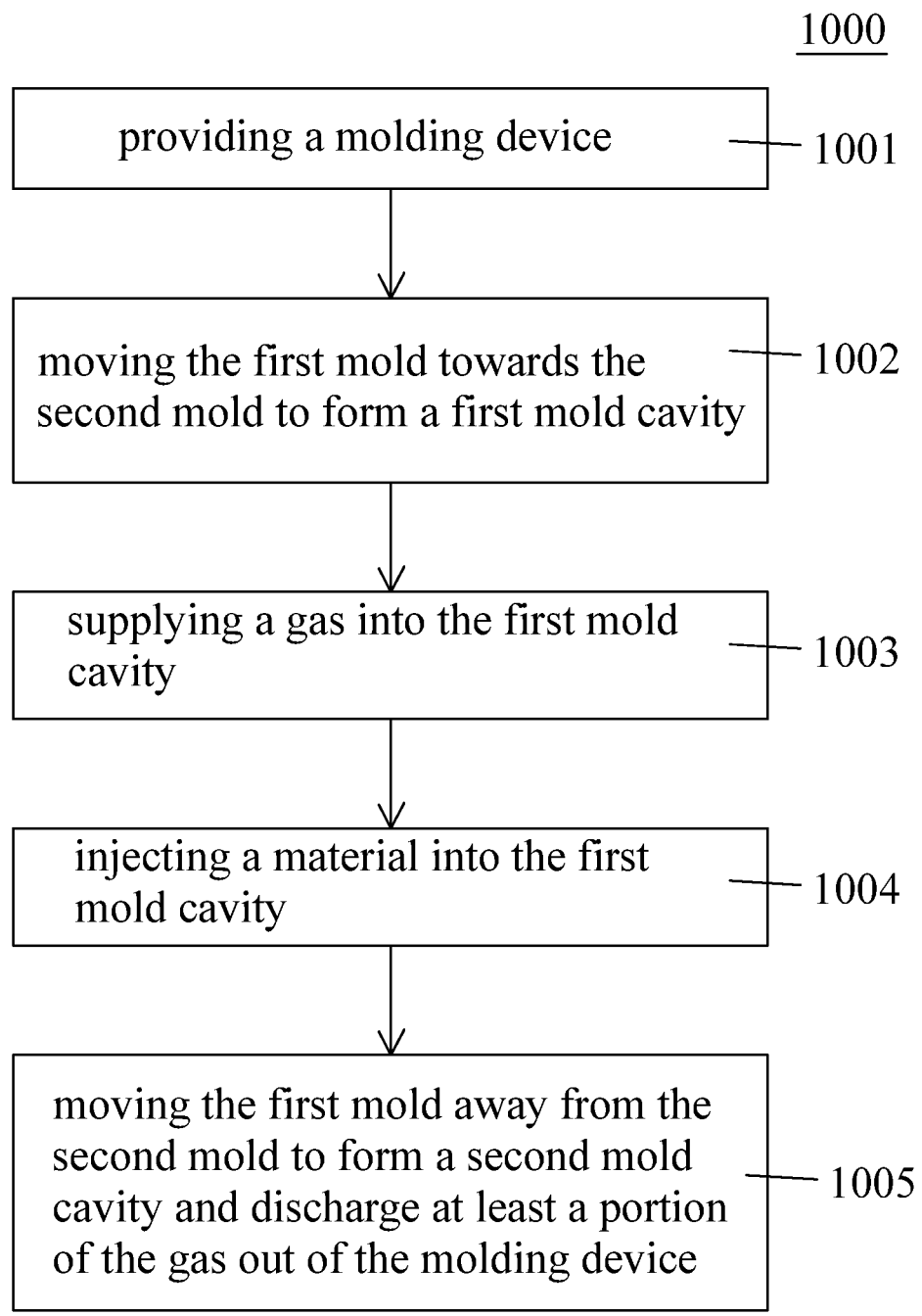
FIG. 1 is a flow chart illustrating a molding method according to one embodiment of the present invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art.

Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

FIG. 1 is a flow chart illustrating a molding method 1000 according to one embodiment of the present invention. In some embodiments, the molding method 1000 includes a number of operations, and the description and illustrations are not deemed as a limitation of the sequence of the operations. In some embodiments, the molding method 1000 includes the following steps. In some embodiments, the molding method 1000 as shown in FIG. 1 includes the following steps, and FIGS. 2-6 are schematic cross-sectional views of various stages of the molding method 1000.

Step 1001: providing a molding device, wherein the molding device includes a first mold and a second mold corresponding to the first mold.

Step 1002: moving the first mold towards the second mold to form a first mold cavity.

Step 1003: supplying a gas into the first mold cavity.

Step 1004: injecting a material into the first mold cavity.

Step 1005: moving the first mold away from the second mold to form a second mold cavity and discharge at least a portion of the gas out of the molding device.

Figure 2:
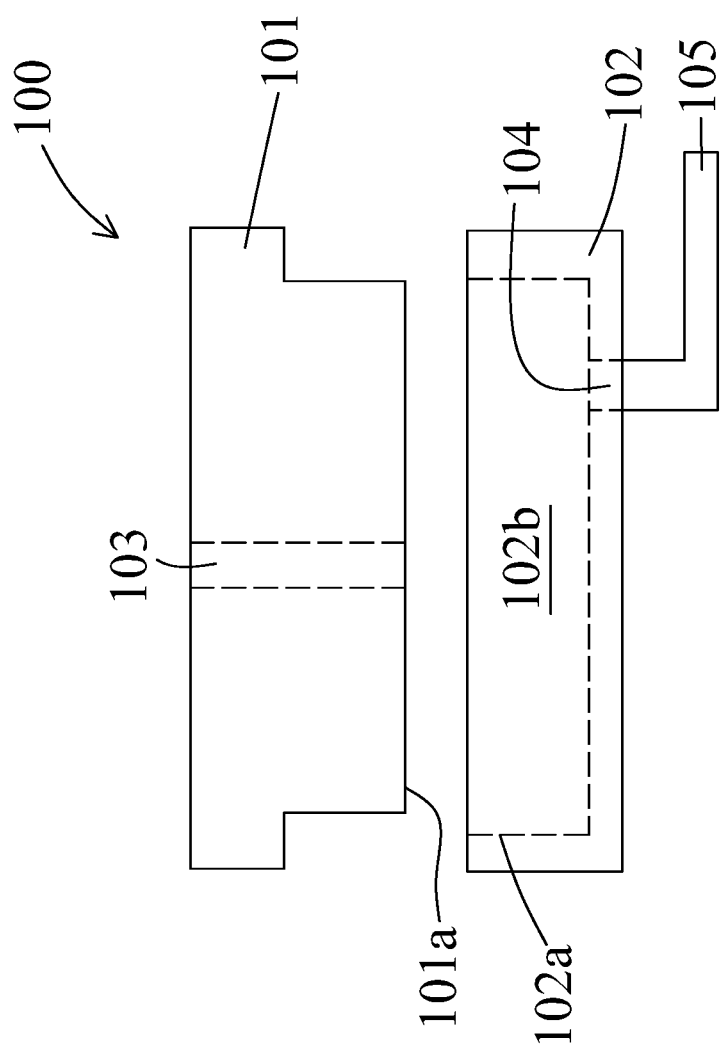
FIGS. 2 to 6 are schematic diagrams illustrating exemplary operations for a molding method according to one embodiment of the present disclosure.

In the step 1001, a molding device 100 is provided as shown in FIG. 2. In some embodiments, the molding device 100 is configured for forming an article. In some embodiments, the molding device 100 includes a first mold 101 and a second mold 102 corresponding to the first mold 101. In some embodiments, the first mold 101 and the second mold 102 are complementary to each other. In some embodiments, the first mold 101 is engageable with the second mold 102. In some embodiments, the first mold 101 and the second mold 102 are disposed opposite to each other. In some embodiments, the first mold 101 is an upper mold, and the second mold 102 is a lower mold. In some embodiments, the first mold 101 includes a first inner sidewall 101a, and the second mold 102 includes a second inner sidewall 102a. In some embodiments, the first inner sidewall 101a is engageable with the second inner sidewall 102a.

In some embodiments, the molding device 100 is initially in an open configuration as shown in FIG. 2. In some embodiments, the molding device 100 is in the open configuration when the first mold 101 is separated from the second mold 102. In some embodiments, the first mold 101 is not in contact with the second mold 102 during the open configuration. In some embodiments, the second mold 102 includes a recess 102b indented into the second mold 102. In some embodiments, the recess 102b is accessible during the open configuration.

In some embodiments, the molding device 100 includes a passage 103 extending through the molding device 100. In some embodiments, the passage 103 is configured for a material flowing through. The material can be any kinds of flowable material. In some embodiments, the passage 103 is disposed at the first mold 101 or the second mold 102. In some embodiments, the passage 103 extends through the first mold 101 or the second mold 102. In some embodiments, several passages 103 can be included in the molding device 100. It would be understood that location, shape and number of the passage 103 are not particularly limited, and may be adjusted depending on the needs. In some embodiments, the passage 103 extends through the first mold 101. In some embodiments, the passage 103 is coupled to the first inner sidewall 101a of the first mold 101.

In some embodiments, the molding device 100 includes a junction point 104 disposed at the molding device 100. In some embodiments, the junction point 104 is configured for supplying or discharging a gas or fluid. The fluid or gas may be air, inert gas, etc., yet the present invention is not limited thereto. In some embodiments, the junction point 104 is disposed at the first mold 101 or the second mold 102. In some embodiments, several junction points 104 can be included in the molding device 100. It would be understood that location, shape and number of the junction point 104 are not particularly limited, and may be adjusted depending on the needs. In some embodiments, the junction point 104 is disposed at the second mold 102. In some embodiments, the junction point 104 is disposed at the second inner sidewall 102a of the second mold 102. In some embodiments, the passage 103 and the junction point 104 are disposed opposite to each other.

In some embodiments, a conduit 105 is optionally included in the molding device 100. In some embodiments, the conduit 105 is configured for a gas or fluid flowing through. The fluid or gas may be air, inert gas, etc., yet the present invention is not limited thereto. In some embodiments, one end of the conduit 105 is coupled to the junction point 104. In some embodiments, the conduit 105 is disposed at the first mold 101 or the second mold 102. In some embodiments, the conduit 105 extends from the junction point 104. In some embodiments, several conduits 105 can be included in the molding device 100. It would be understood that location, shape and number of the conduit 105 are not particularly limited, and may be adjusted depending on the needs. In some embodiments, the conduit 105 connects to one or more junction points 104.

Figure 3:
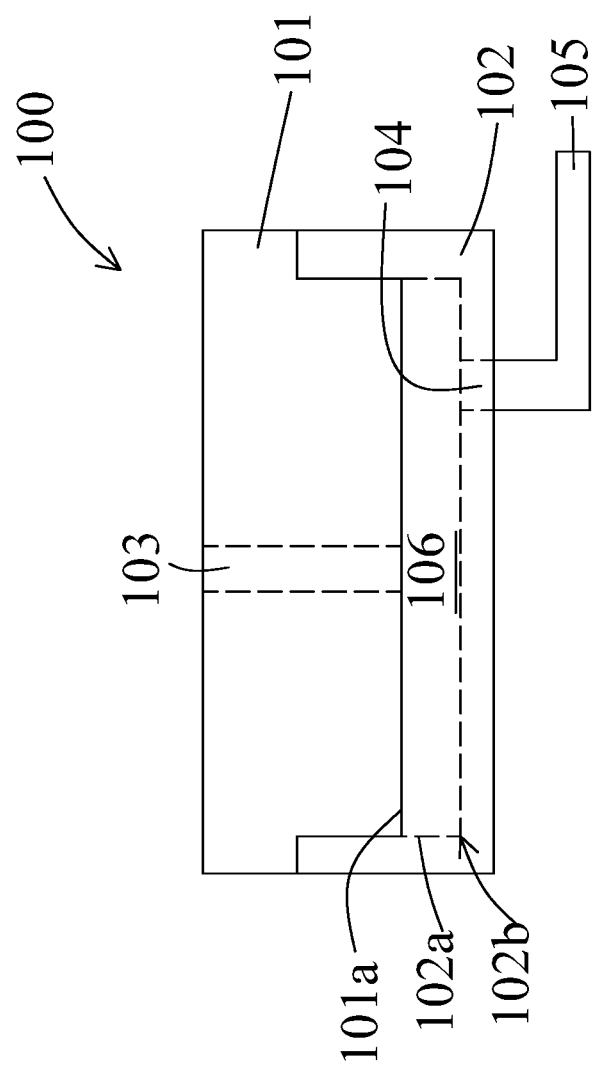

In the step 1002, the first mold 101 is moved towards the second mold 102 to form a first mold cavity 106 as shown in FIG. 3. In some embodiments, the first mold cavity 106 is formed by moving the first mold 101 towards the second mold 102, moving the second mold 102 towards the first mold 101, or moving the first mold 101 and the second mold 102 towards each other. In some embodiments, the first mold 101 is engaged with the second mold 102 to form the first mold cavity 106. In some embodiments, the first mold cavity 106 is defined by the first inner sidewall 101a and the second inner sidewall 102a. In some embodiments, the molding device 100 is changed from the open configuration as shown in FIG. 2 to a closed configuration as shown in FIG. 3 after the movement of the first mold 101 or the second mold 102. In some embodiments, the first mold 101 is tightly engaged with the second mold 102 when the molding device 100 is in the closed configuration.

After the closing of the molding device 100, the first mold cavity 106 is formed. In some embodiments, the first mold cavity 106 is sealed when the molding device 100 is in the closed configuration. In some embodiments, the first mold cavity 106 is configured to hold a material and form an article within the first mold cavity 106. In some embodiments, the first mold cavity 106 is configured to accommodate a material and allows the material to be made into a molded article having predetermined shape by mold forming.

In some embodiments, the first mold cavity 106 is communicable with the passage 103. In some embodiments, a material is flowable into the first mold cavity 106 through the passage 103. In some embodiments, the conduit 105 is communicable with the first mold cavity 106 through the junction point 104. In some embodiments, a gas or fluid is flowable into or dischargeable from the first mold cavity 106 through the junction point 104. In some embodiments, the conduit 105 is configured to supply or discharge a gas or fluid into or out of the first mold cavity 106.

In step 1003, a gas or fluid is supplied to the first mold cavity 106. In some embodiments, the gas or fluid (for example, inert gas, nitrogen, carbon dioxide, etc.) is supplied to the first mold cavity 106 through the junction point 104. In some embodiments, the first mold cavity 106 is fully or partially filled by the gas or fluid. In some embodiments, a source (not shown) is coupled to one end of the conduit 105, such that the gas or fluid is supplied from the source to the first mold cavity 106 through the junction point 104. In some embodiments, the source is configured to supply a fluid or gas, in which a suitable fluid or gas may be supplied depending on the needs; for example, the fluid or gas may be air, inert gas, etc., yet the present invention is not limited thereto.

In some embodiments, the gas or fluid is flowed into the first mold cavity 106 when the molding device 100 is in the closed configuration. In some embodiments, the gas or fluid is flowed into the first mold cavity 106 to increase a pressure inside the first mold cavity 106. In some embodiments, a pressure of the first mold cavity 106 is increased to a first pressure after the supply of the gas or fluid to the first mold cavity 106. The first mold cavity has the first pressure after the supply of the gas or fluid to the first mold cavity 106.

Figure 4:
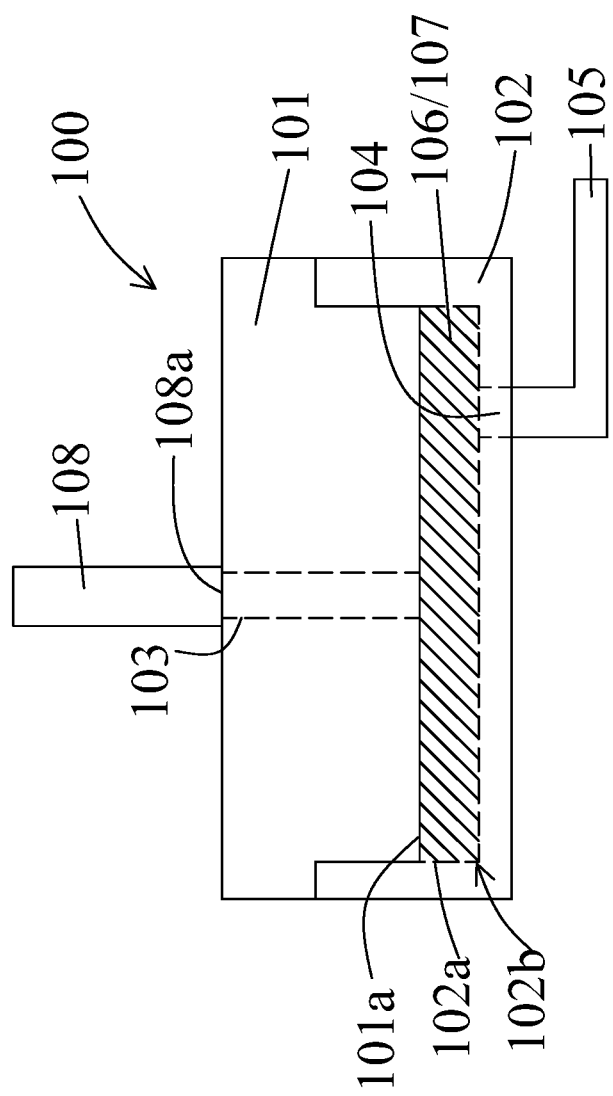

In the step 1004, a material 107 is supplied to the first mold cavity 106 as shown in FIG. 4. In some embodiments, the material 107 is injected into the first mold cavity 106 through the passage 103 communicable with the first mold cavity 106. In some embodiments, the material 107 is injected into the first mold cavity 106 from an injector 108 via an outlet 108a of the injector 108. In some embodiments, the outlet 108a of the injector 108 is engaged with the passage 103 after the formation of the first mold cavity 106. In some embodiments, the outlet 108a is engaged with the passage 103 before or after the supply of the gas or fluid to the first mold cavity 106.

In some embodiments, the material 107 is injected into the first mold cavity 106 from the injector 108 after the supply of the gas or fluid to the first mold cavity 106. In some embodiments, the material 107 is injected into the first mold cavity 106 when a pressure inside the first mold cavity 106 reaches the first pressure. In some embodiments, the material 107 flows from the first mold 101 towards the second mold 102. In some embodiments, the material 107 flows from first inner sidewall 101a of the first mold 101 towards the second inner sidewall 102a of the second mold 102. In some embodiments, after the injection of the material 107 into the first mold cavity 106, the injector 108 is moved away from the passage 103. In some embodiments, a pressure inside the first mold cavity 106 further increases from the first pressure to a second pressure after the injection of the material 107 into the first mold cavity 106. In some embodiments, the second pressure is substantially greater than the first pressure.

In some embodiments, the junction point 104 is entirely or partially covered by the material 107 after the injection of the material 107 into the first mold cavity 106. In some embodiments, the injector 108 is coupled with an injection molding machine or extrusion molding machine, so that the material 107 can be injected/extruded into the first mold cavity 106 from the injection molding machine or extrusion molding machine.

In some embodiments, the material 107 is a foamble material. In some embodiments, the material 107 is a flowable material. In some embodiments, the material 107 includes polymer. In some embodiments, the material 107 is a mixture of a high molecular weight polymer and a blowing agent. In some embodiments, the blowing agent is a physical or chemical additive that releases gas during the heating process, thereby forming pores. In some embodiments, the blowing agent is a physical additive. In some embodiments, the blowing agent is a supercritical fluid (SCF).

Figure 5:
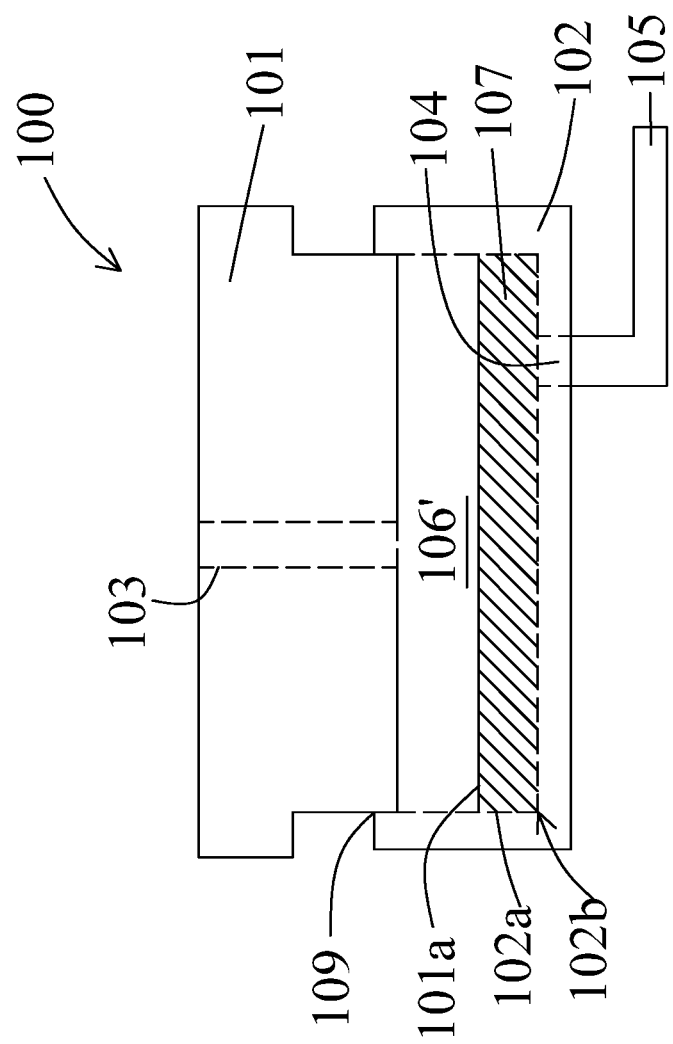

In the step 1005, the first mold 101 is moved away from the second mold 102 to form a second mold cavity 106' and discharge at least a portion of a gas out of the molding device 100, as shown in FIG. 5. In some embodiments, the injector 108 is moved away from the passage 103 before the movement of the first mold 101 away from the second mold 102. In some embodiments, the first mold 101 or the second mold 102 are moved away from each other to form the second mold cavity 106'. In some embodiments, the second mold 102 is moved away from the first mold 101 to form the second mold cavity 106'. In some embodiments, the first mold 101 is movable, while the second mold 102 is stationary. In some embodiments, the second mold 102 is movable, while the first mold 101 is stationary. In some embodiments, both the first mold 101 and the second mold 102 are movable relative to each other.

In some embodiments, the first mold cavity 106 is enlarged to become the second mold cavity 106' by the movement of the first mold 101 away from the second mold 102, the movement of the second mold 102 away from the first mold 101 or the movement of the first mold 101 and the second mold 102 away from each other. In some embodiments, the first mold 101 and the second mold 102 are still engaged with each other during or after the enlargement.

In some embodiments, a void surrounded by the material 107, the first mold 101 and the second mold 102 is formed during or after the enlargement. In some embodiments, the molding device 100 is in a slight open configuration as shown in FIG. 5. The molding device 100 is in the slight open configuration, and the second mold cavity 106' is formed. In some embodiments, the first mold 101 is in contact with the second mold 102 during or after the enlargement. The first mold 101 is in contact with the second mold 102 when the molding device 100 is in the slight open configuration.

In some embodiments, a first volume of the first mold cavity 106 is substantially less than a second volume of the second mold cavity 106'. In some embodiments, the first volume is increased to the second volume. In some embodiments, the molding device 100 is in the slight open configuration when the second mold cavity 106' is maintained at the second volume.

In some embodiments, the molding device 100 is slightly open to allow the gas flowing out in all direction from the molding device 100 or the second mold cavity 106'. In some embodiments, at least a portion of the gas is discharged out of the molding device 100 or the second mold cavity 106'. In some embodiments, a gap 109 between the first mold 101 and the second mold 102 is formed when the second mold cavity 106' is formed. In some embodiments, the gap 109 is formed along peripheries of the first mold 101 and the second mold 102 or along interfaces between the first mold 101 and the second mold 102. In some embodiments, the gap 109 is communicable with the second mold cavity 106', such that the gas is flowable from the second mold cavity 106' towards the gap 109. In some embodiments, at least the portion of the gas is discharged out of the molding device 100 through the gap 109. In some embodiments, the gap 109 has a width of less than 100 mm. In some embodiments, the width of the gap 109 is substantially less than 50 mm.

In some embodiments, the material 107 undergoes physical or chemical foaming after injecting into the first mold cavity 106, and a gas within the second mold cavity 106' can be discharged out of the second mold cavity 106' when the molding device 100 is in the slight open configuration. In some embodiments, the molding device 100 is maintained in the slight open configuration for a predetermined duration after the injection of the material 107, during the foaming process or after the foaming process. In some embodiments, the second mold cavity 106' is maintained at the second volume for the predetermined duration. In some embodiments, the predetermined duration is about few seconds. In some embodiments, the predetermined duration is dependent on a pressure inside the second mold cavity 106'. In some embodiments, the predetermined duration is about 1 second to 5 seconds.

In some embodiments, the second mold cavity 106' has a third pressure after the movement of the first mold 101 away from the second mold 102. In some embodiments, the second pressure is substantially greater than the third pressure. In some embodiments, the molding device 100 is maintained in the slight open configuration until the third pressure inside the second mold cavity 106' is decreased to or reaches an atmospheric pressure (1 atm).

In some embodiments, the conduit 105 is configured to discharge at least the portion of the gas out of the molding device 100. In some embodiments, some of the gas can be discharged from the second mold cavity 106' through the conduit 105. In some embodiments, at least the portion of the gas is discharged from the gap 109 and/or the conduit 105 out of the second mold cavity 106'. Since the gas can be discharged from the second mold cavity 106' through the conduit 105 as well as the gap 109 (by the slight opening of the molding device 100), the gas can be discharged out of the second mold cavity 106' instantly and efficiently.

In some embodiments, the junction point 104 is at least partially covered after injecting the material 107 into the first mold cavity 106, the gas cannot be efficiently or even cannot be discharged through the junction point 104. As such, the slight opening of the molding device 100 can facilitate or even accelerate the gas discharging from the second mold cavity 106'. As a result, a quality of an article subsequently formed within the second mold cavity 106' is improved.

In some embodiments, after discharging of the gas out of the second mold cavity 106', the molding device 100 would change from the slight open configuration to the closed configuration (as illustrated in FIG. 3). In some embodiments, when the third pressure inside the second mold cavity 106' reaches an atmospheric pressure (1 atm), the molding device 100 would change from the slight open configuration to the closed configuration. In some embodiments, the molding device 100 is maintained in the closed configuration until an article 107' is formed. In some embodiments, the molding device 100 would change from the closed configuration to a fully open configuration as shown in FIG. 6 when the article 107' is formed and ready for picking out from the recess 102b of the second mold 102.

Figure 6:
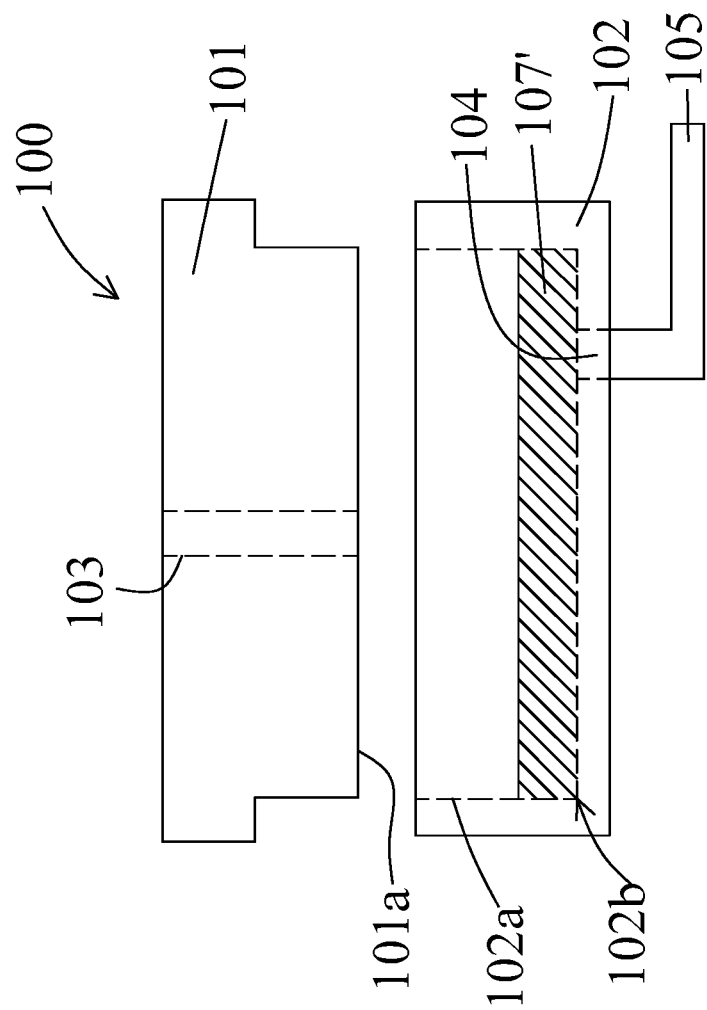

Alternatively, in some embodiments, after discharging of the gas out of the second mold cavity 106', the molding device 100 would change from the slight open configuration to the fully open configuration (as illustrated in FIG. 6). In some embodiments, when the third pressure inside the second mold cavity 106' reaches an atmospheric pressure (1 atm) and the article 107' is formed and ready for picking out from the recess 102b of the second mold 102, the molding device 100 would change from the slight open configuration to the fully open configuration.

In some embodiments, the first mold 101 is further moved away from the second mold 102 to fully open the molding device 100 as shown in FIG. 6. In some embodiments, the molding device 100 is fully open by moving the first mold 101 away from the second mold 102, moving the second mold 102 away from the first mold 101 or moving the first mold 101 and the second mold 102 away from each other. In some embodiments, the first mold 101 is separated from the second mold 102 when the molding device 100 is in the fully open configuration. In some embodiments, the first mold 101 is not in contact with the second mold 102 and the recess 102b of the second mold 102 is accessible when the molding device 100 is in the fully open configuration. In some embodiments, the article 107' cannot be picked out from the recess 102b when the molding device 100 is in the slight open configuration or the closed configuration. The article 107' can be picked out from the recess 102b when the molding device 100 is in the fully open configuration.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein, may be utilized according to the present invention. Accordingly, the appended claims are intended to include within their scope such processes, machines, manufacture, compositions of matter, means, methods and steps.

What is claimed is:

1. A molding method, comprising:
providing a molding device, wherein the molding device includes a first mold, a second mold corresponding to the first mold, and a junction point disposed at a second inner sidewall of the second mold;
moving the first mold towards the second mold to form a first mold cavity;
supplying a gas to the first mold cavity via the junction point to increase a pressure inside the first mold cavity to a first pressure;
after accomplishment of the supplying of the gas, injecting a material into the first mold cavity, wherein the pressure inside the first mold cavity further increases from the first pressure to a second pressure during the injection of the material into the first mold cavity, the pressure inside the first mold cavity is at the second pressure after accomplishment of the injecting of the material, the junction point is closed and the gas is not dischargeable out of the first mold cavity through the junction point during and after the injection of the material into the first mold cavity; and
after accomplishment of the injecting of the material, moving the first mold away from the second mold to form a second mold cavity and a gap between the first mold and the second mold and to discharge at least a portion of the gas out of the second mold cavity via the gap, wherein the second mold cavity has a third pressure, the second pressure decreases to the third pressure during the movement of the first mold away from the second mold, and the pressure inside the second mold cavity is at the third pressure after accomplishment of the movement of the first mold away from the second mold, the junction point is closed and the gas is not dischargeable out of the second mold cavity through the junction point during the movement of the first mold away from the second mold, wherein the first mold cavity and the second mold cavity are communicable with the junction point, and a first volume of the first mold cavity is less than a second volume of the second mold cavity.

2. The method of claim 1, wherein the gas is dischargeable out of the molding device through the junction point after accomplishment of the movement of the first mold away from the second mold.

3. The method of claim 1, wherein the gap between the first mold and the second mold is formed when the second mold cavity is formed, and the gap is communicable with the second mold cavity.

4. The method of claim 2, wherein the junction point is entirely or partially covered by the material after the injection of the material into the first mold cavity.

5. The method of claim 1, wherein the first mold cavity and the second mold cavity are defined by a first inner sidewall of the first mold and the second inner sidewall of the second mold.

6. The method of claim 1, wherein the first mold cavity has the first pressure after the supply of the gas into the first mold cavity and prior to the injection of the material, and the first pressure is greater than the third pressure.

7. The method of claim 6, wherein the third pressure drops to an atmosphere pressure when the second mold cavity is maintained at the second volume.

8. The method of claim 1, wherein the second mold cavity is maintained at the second volume for about 1 second to 5 seconds.

9. The method of claim 1, wherein the molding device is in a closed configuration when the first mold cavity is formed.

10. The method of claim 1, wherein the molding device is in a slight open configuration when the second mold cavity is formed.

11. The method of claim 2, wherein a conduit is connected to the junction point and is configured to supply the gas into the first mold cavity or discharge at least the portion of the gas out of the second mold cavity.

12. The method of claim 1, wherein the material is injected into the first mold cavity through a passage communicable with the first mold cavity.

13. The method of claim 12, further comprising:
engaging an outlet of an injector with the passage after the formation of the first mold cavity;
moving the injector away from the passage after the injection of the material into the first mold cavity and before the movement of the first mold away from the second mold.

14. A molding method, comprising:
providing a molding device, wherein the molding device includes a first mold, a second mold corresponding to the first mold, a junction point disposed at the molding device;

moving the first mold towards the second mold to form a first mold cavity;

injecting a gas to the first mold cavity via the junction point to increase a pressure inside the first mold cavity to a first pressure;

after accomplishment of the supplying of the gas, injecting a material into the first mold cavity, wherein the pressure inside the first mold cavity further increases from the first pressure to a second pressure during the injection of the material into the first mold cavity, and the pressure inside the first mold cavity is at the second pressure after accomplishment of the injecting of the material, the junction point is closed and the gas is not dischargeable out of the first mold cavity through the junction point during and after the injection of the material into the first mold cavity; and after accomplishment of the injecting of the material, moving the first mold and the second mold away from each other to form a second mold cavity and a gap between the first mold and the second mold and to discharge at least a portion of the gas out of the second mold cavity via the gap, wherein the second mold cavity has a third pressure, the second pressure decreases to the third pressure during the movement of the first mold and the second mold away from each other, and the pressure inside the second mold cavity is at the third pressure after accomplishment of the movement of the first mold and the second mold away from each other, the junction point is closed and the gas is not dischargeable out of the second mold cavity through the junction point during the movement of the first mold and the second mold away from each other, wherein the first mold cavity and the second mold cavity are communicable with the junction point, and a first volume of the first mold cavity is less than a second volume of the second mold cavity.

15. The method of claim 14, wherein the first mold and the second mold are movable relative to each other.

16. The method of claim 14, wherein the moving of the first mold and the second mold includes enlarging the first mold cavity to the second mold cavity.

17. The method of claim 14, wherein the first mold is in contact with the second mold during or after the moving of the first mold and the second mold.

18. The method of claim 14, wherein the third pressure drops to an atmosphere pressure when the second mold cavity is maintained at the second volume.

* * * * *